(12) United States Patent
Harris

(10) Patent No.: US 7,516,834 B2
(45) Date of Patent: *Apr. 14, 2009

(54) FEED TABLE WITH FORCE REACTION SYSTEM

(75) Inventor: Gerald R. Harris, Chouteau, OK (US)

(73) Assignee: HEM, Inc., Pryor, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/528,075

(22) Filed: Sep. 26, 2006

(65) Prior Publication Data

US 2007/0017777 A1    Jan. 25, 2007

Related U.S. Application Data

(62) Division of application No. 10/729,870, filed on Dec. 5, 2003, now Pat. No. 7,111,720.

(51) Int. Cl.
*B65G 47/22* (2006.01)
*B23D 53/00* (2006.01)
*B23D 55/00* (2006.01)

(52) U.S. Cl. ..................... 198/345.1; 83/801
(58) Field of Classification Search .............. 198/345.1; 83/801
See application file for complete search history.

(56) References Cited

U.S. PATENT DOCUMENTS

| | | | |
|---|---|---|---|
| 3,474,693 A | 10/1969 | Wilkie et al. | |
| 3,504,585 A | 4/1970 | Harris | |
| 4,179,961 A | 12/1979 | Harris | |
| 5,099,979 A | 3/1992 | Kehrel | |
| 5,353,910 A * | 10/1994 | Harris et al. | 198/345.1 |
| 5,944,477 A | 8/1999 | Shill | |
| 6,231,036 B1 | 5/2001 | Johnson et al. | |
| 6,648,120 B2 | 11/2003 | Konieczny | |

* cited by examiner

*Primary Examiner*—Mark A Deuble
(74) *Attorney, Agent, or Firm*—McAfee & Taft

(57) ABSTRACT

A feed table with force reaction system for counteracting clamping forces on a shuttle vise used to move a workpiece toward a machine tool. In a first embodiment, lever arms are attached to an upper guide rail between two vertical columns. A reaction actuator interconnects upper ends of the lever arms such that when actuated, a reaction force is applied to the vertical columns by lower ends of the lever arms to counteract clamping forces created by a clamping actuator attached to one of the vertical columns. In a second embodiment, lever arms are also used and interconnected at the upper ends thereof by a reaction bar. A reaction actuator is attached to a lower end of each of the lever arms to apply the reaction force. In third and fourth embodiments, a clamping force bar is positioned above the upper guide beam. A clamping actuator is attached to the clamping force bar such that clamping forces are not transmitted to the vertical columns.

7 Claims, 14 Drawing Sheets

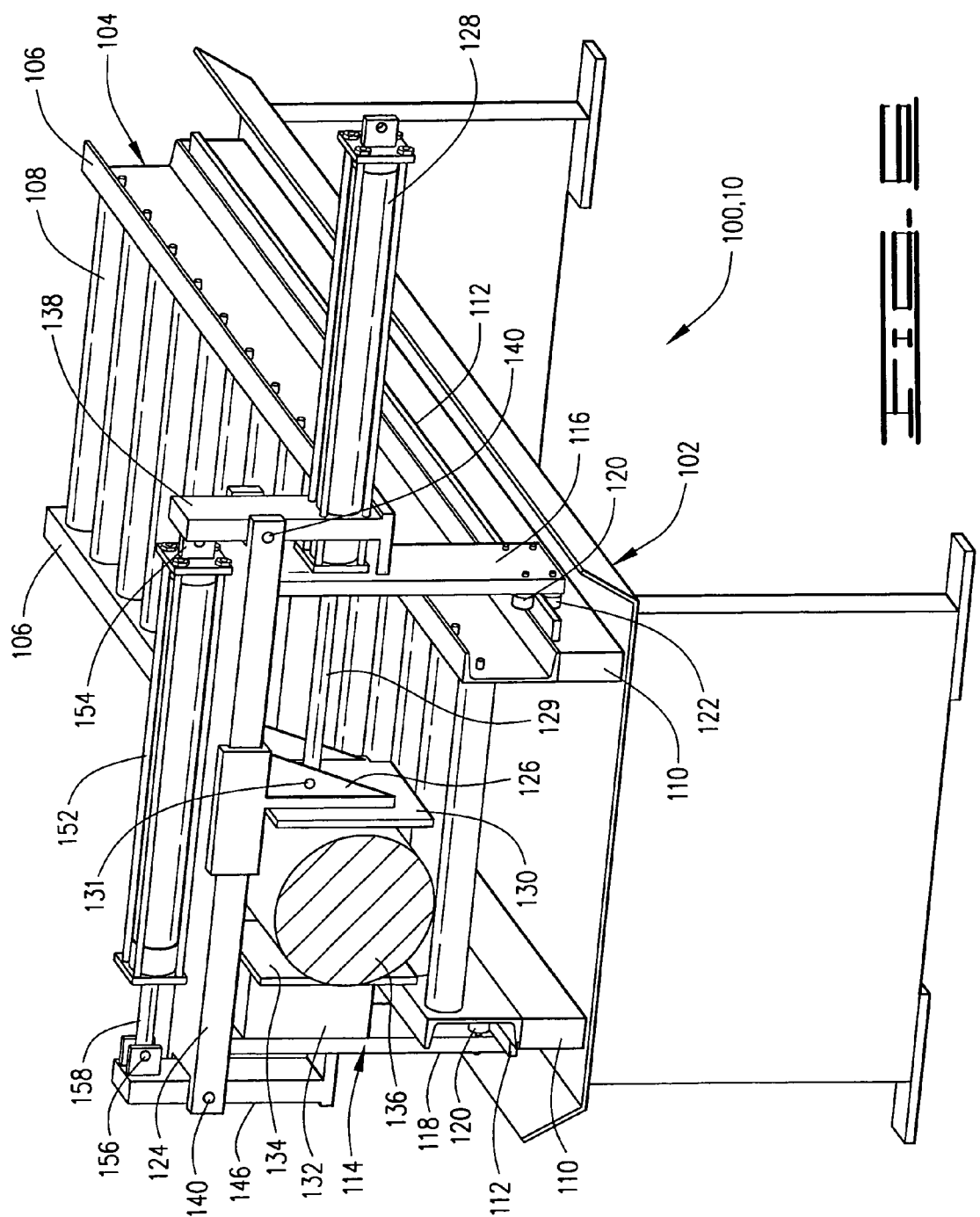

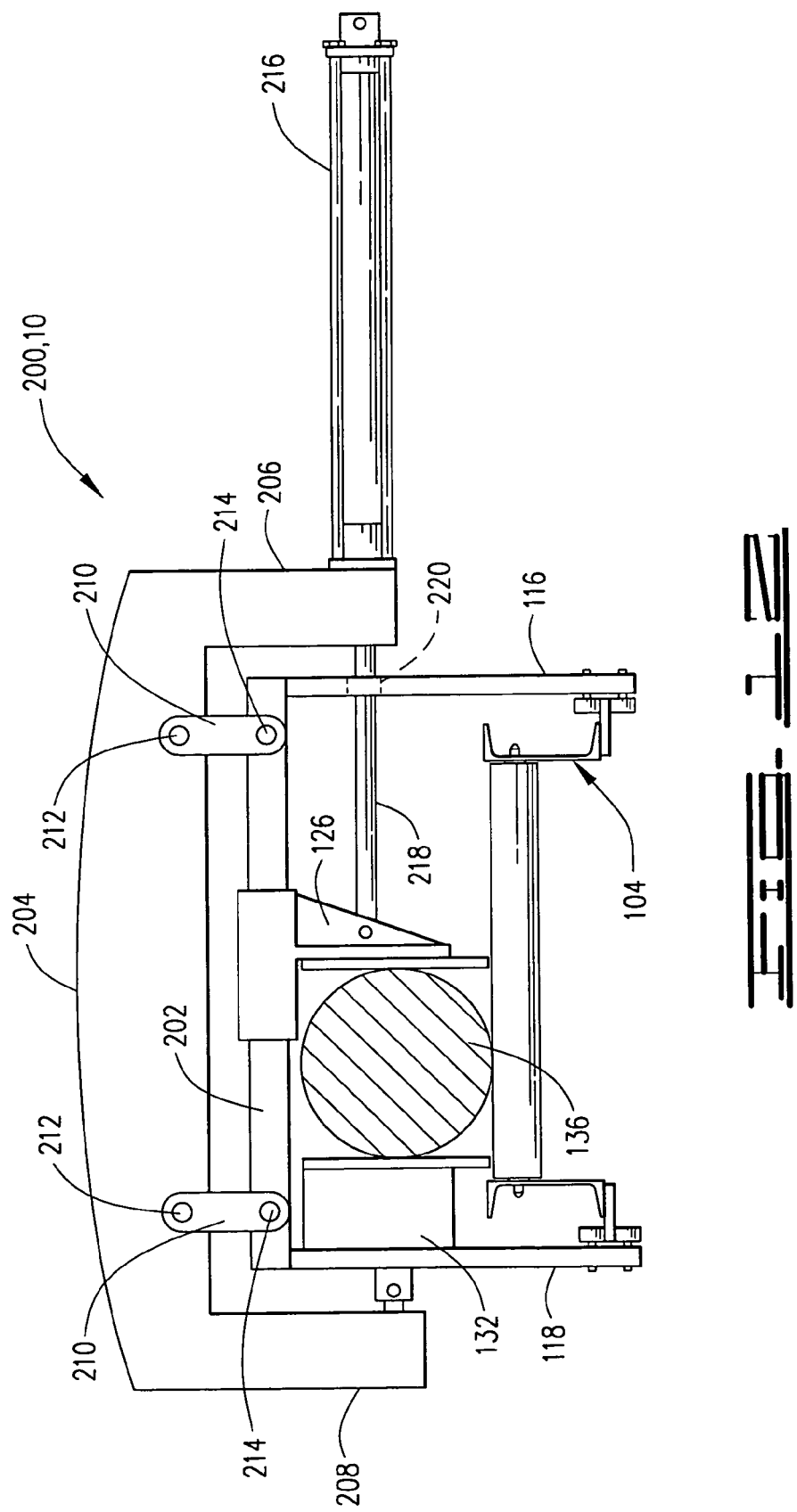

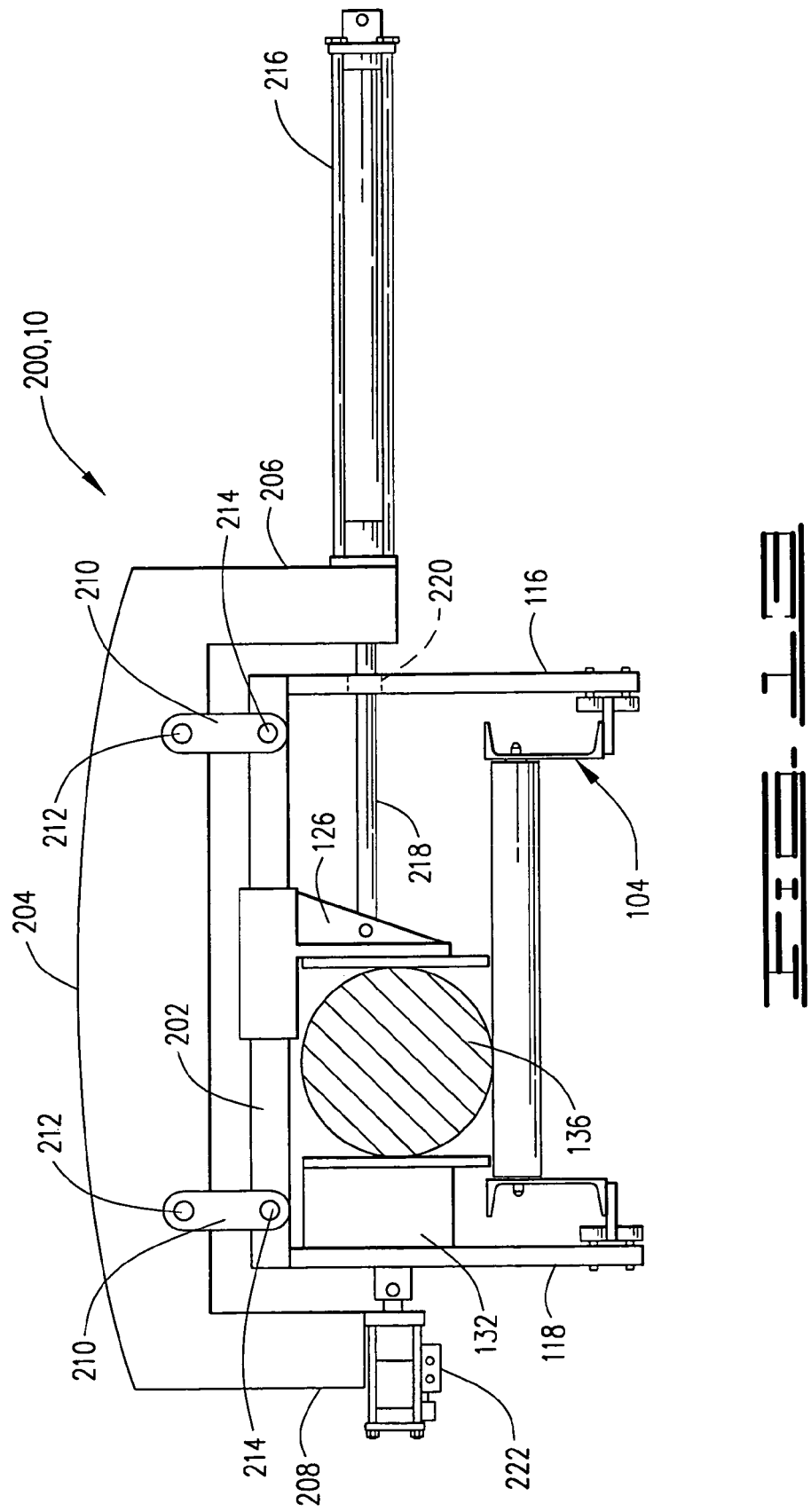

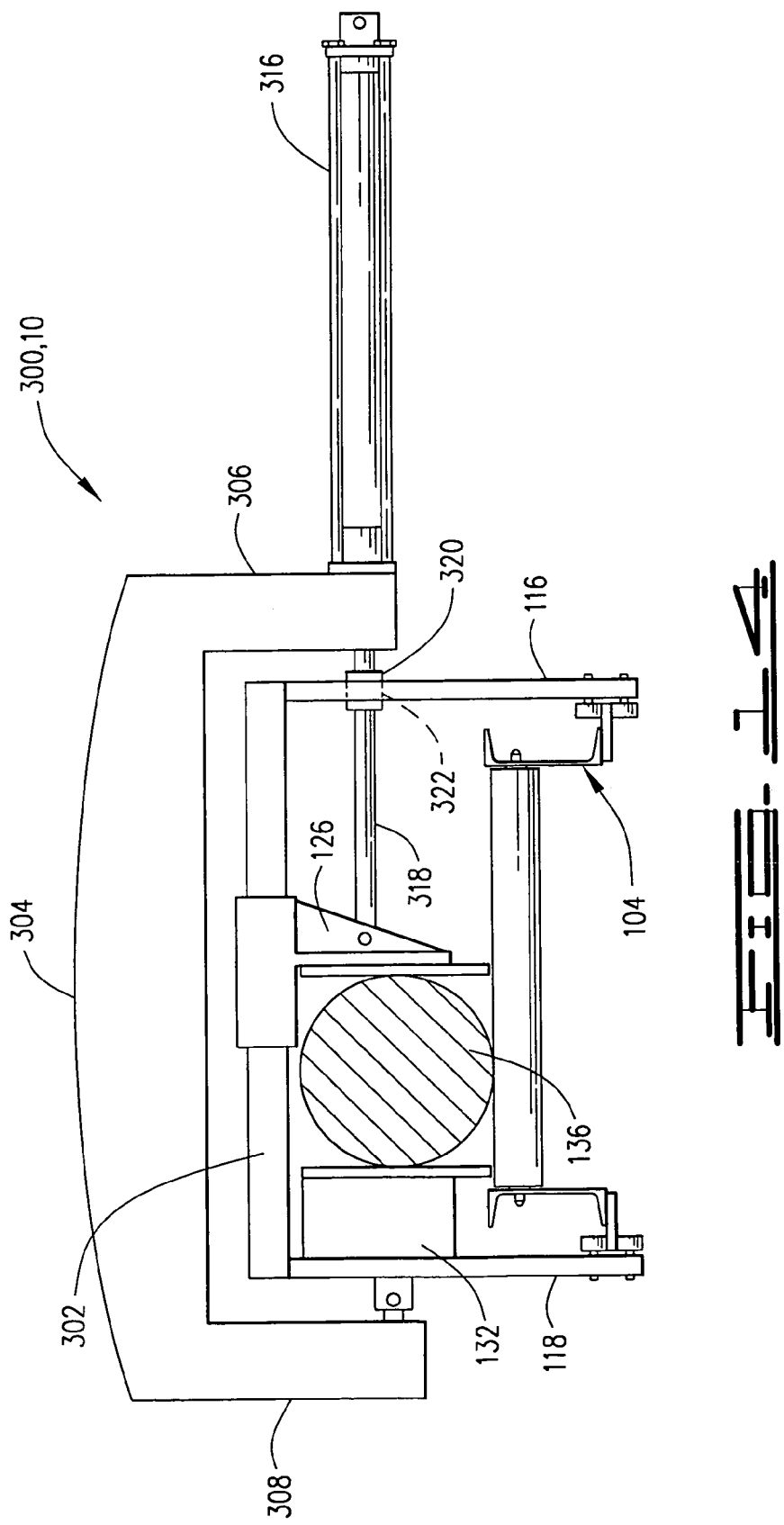

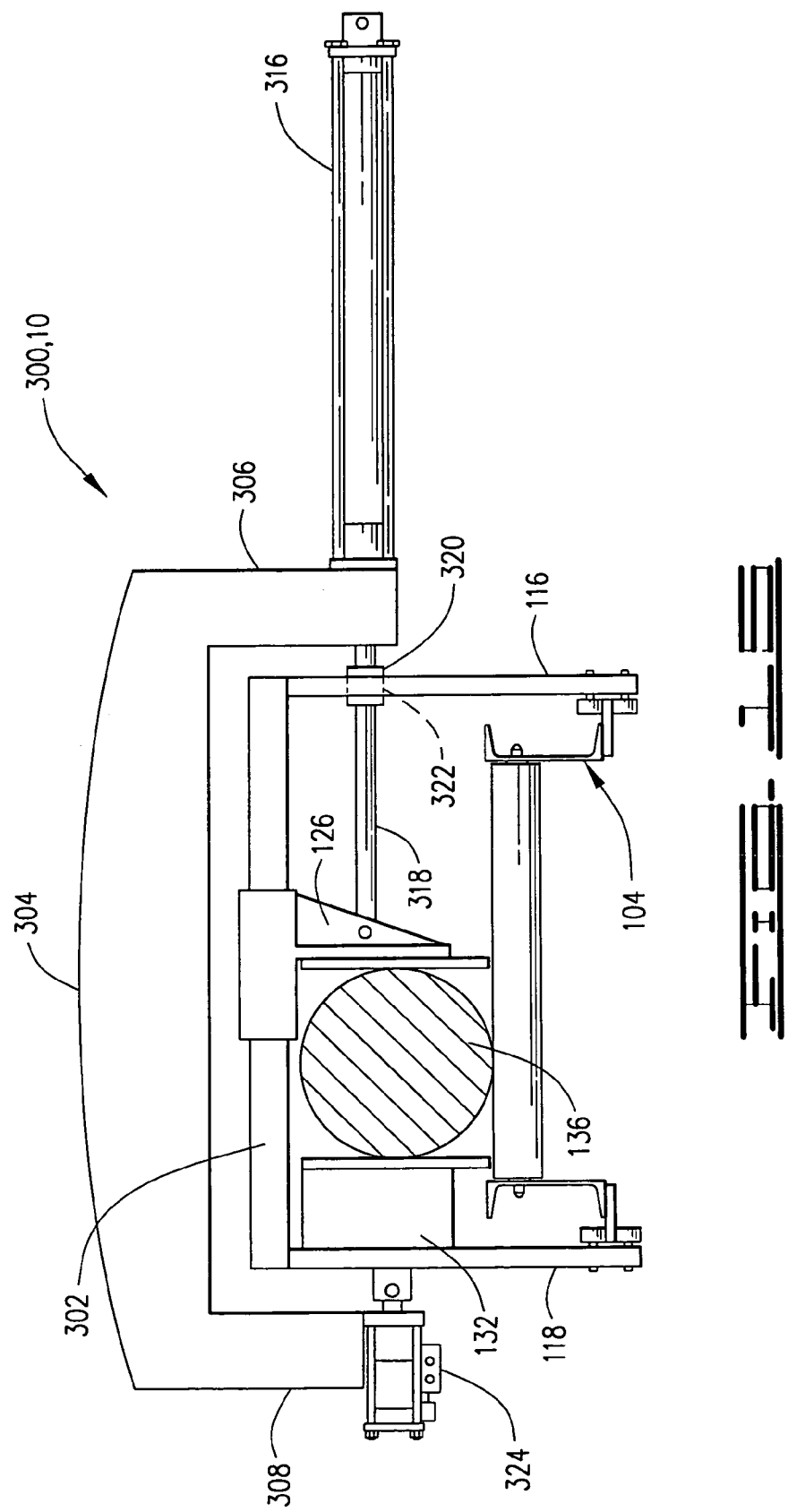

FEED TABLE WITH FORCE REACTION SYSTEM

CROSS-REFERENCE TO RELATED APPLICATION

This application is a divisional of U.S. patent application Ser. No. 10/729,870 filed Dec. 5, 2003 now U.S. Pat. No. 7,111,720.

BACKGROUND OF THE INVENTION

1. Field of the Invention

This invention relates to feed tables used for clamping and feeding elongated workpieces to a machine tool, such as a band saw, and more particularly, to a feed table with a force reaction system for counteracting the deflection in a shuttle vise normally caused by clamping the workpiece.

2. Description of the Prior Art

On machine tools, such as band saws, used for cutting elongated bar stock or other types of workpieces, devices, generally called feed tables, have been developed to clamp the workpiece and feed it toward the machine tool. In some prior art feed tables, a movable shuttle vise is used to clamp the material and then move it along a conveyor to a desired point at which the material is to be cut. The process is repeated as often as necessary until the workpiece is fully utilized. The feed tables are frequently automated. The feed table includes a roller conveyor assembly which provides rolling support of the workpiece. In one prior art device, a fixed vise assembly and the movable shuttle vise assembly are attached to a frame on the feed table. The fixed vise and shuttle vise assemblies cooperate to grip and stabilize the workpiece during cutting by the machine tool in addition to the shuttle vise being adapted to move the workpiece toward the cutting area of the machine tool.

When production cutting on bar stock is performed, the feeding and cutting sequence typically includes a series of automated steps such as: gripping of the workpiece with the movable shuttle vise assembly, releasing the fixed vise assembly, advancing the workpiece toward the cutting area of the machine tool by moving the shuttle vise assembly along the conveyor, stabilizing the workpiece by clamping it again in the fixed vise assembly, cutting the workpiece as desired, releasing the movable shuttle vise assembly and moving it away from the cutting area while continuing to clamp the workpiece by the fixed vise assembly, gripping the workpiece again with the movable vise assembly, releasing the fixed vise assembly, and again advancing the workpiece toward the cutting area of the machine tool for the next machining operation. This series of steps is repeated as desired.

Feed table designs such as these generally include opposing vise jaws cantilevered upwardly from vise bases which are fixedly mounted in the case of the fixed vise assembly, or movably mounted on feed table guide ways in the case of the shuttle vise assembly. These upwardly cantilevered jaws have been found to have a common problem, namely, when clamping workpieces, and in particularly large workpieces, the opposing jaws tend to spread out or open up at the upper portion of the jaws. As the jaws are pushed against the workpiece by an actuating mechanism such as a hydraulic cylinder, the resistance to compression exerted by the workpiece causes the upper portions of the jaws to separate outwardly.

Such separation can be problematic because the workpiece will not be properly gripped by either the fixed vise assembly or the shuttle vise assembly, and this may permit the workpiece to move or slip upwardly and/or axially before or during the cutting sequence. If this occurs, the workpiece may not be properly cut which adversely affects cutting precision and accuracy, and in extreme situations, necessitates scrapping the workpiece or portions cut from it. Examples of such feed tables are disclosed in U.S. Pat. Nos. 4,179,961 and 3,504,585 to Harris and U.S. Pat. No. 3,474,693 to Wilkie, et al.

As the length, diameter, and accordingly the weight, of workpieces increase, machine tool feed table conveyors have employed guide roller assemblies which include a plurality of side-by-side rollers capable of supporting and advancing larger and heavier workpieces. Some prior art feed tables also have included reaction frame assemblies which add substantial lateral stability and rigidity to the opposing jaws of the fixed vise and/or shuttle vise assemblies. One such prior art feed table is disclosed as prior art in U.S. Pat. No. 5,353,910 to Harris. This prior art device includes a vise reaction frame assembly which extends over and under the guide roller assembly. The vise reaction frame assembly is positioned to resist the tendency of the opposing jaws of the shuttle vise assembly to open up in reaction to clamping the workpiece. The shuttle vise assembly includes at least one movable jaw mounted to a first upright post and another jaw mounted to a second upright post and which may be rigidly affixed thereto. The reaction frame assembly includes cross beams which are rigidly secured between the top and bottom of the first and second posts and thus encircle the guide roller assembly. Accordingly, gripping of a workpiece with a vise having such a reaction frame is very positive because the previously described reaction forces are resisted by the reaction frame assembly. This reduces the tendency of the opposing jaws to spread apart during clamping of the workpiece.

In order to provide for movement of a shuttle vise assembly having such a reaction frame, the shuttle vise assembly must be capable of moving longitudinally along the guide roller assembly. Thus, the lower cross beam may be mounted on a pair of drive screws which reciprocate the shuttle vise assembly relative to the roller assembly. In operation, the drive screws cause the shuttle vise assembly and the vise jaws mounted thereon to move along the feed table outside longitudinal roller frame members which support the rollers in the guide roller assembly. Other types of guide rail systems could also be used. However, this construction requires that the guide roller assembly be raised and mounted on support legs at the ends of the roller frame members so that the cross beams can pass above and below the roller frame members. This prior art invention disclosed in U.S. Pat. No. 5,353,910 to Harris will be further discussed herein.

Accordingly, although such reaction frame assemblies effectively counteract the reaction forces caused by clamping the workpiece with the vise jaw, they require a long unsupported span of roller frame members between the support legs. This span requires that the roller frame members be sized significantly large enough to provide strength for the entire roller frame assembly when supporting the workpiece. This greatly adds to the bulk of the roller frame assembly and still may not be sufficient to prevent undesired movement or deflection thereof when handling very large workpieces. There is a need, therefore, for a feed table with a force reaction system which can counteract the clamping forces to avoid deflection of the jaws but which allows the roller frame assembly to be mounted directly onto the feed table for greater support and to eliminate the lower cross beam.

The present invention solves these problems by providing a feed table with force reaction system which counteracts the deflection of vise jaws caused by actuation thereof by applying substantially equal forces to the vise in opposite directions from the clamping forces.

SUMMARY OF THE INVENTION

The present invention provides a feed table with force reaction system. The force reaction system is incorporated into a movable vise assembly used to clamp and feed material to a machine tool in a way that the clamping forces on the workpiece are counteracted, thus eliminating or greatly reducing the tendency of vertical columns in the vise assembly to be spread apart by the clamping forces.

The feed table apparatus of the present invention may be described as comprising a conveyor for supporting the workpiece, a shuttle vise movably disposed on the conveyor and having jaws thereon adapted for clamping the workpiece when a clamping force is applied thereto, and a reaction system connected to the shuttle vise adapted for applying a reaction force in an opposite direction of the clamping force and thereby substantially counteracting the clamping force.

The apparatus further comprises a feed table frame, wherein the conveyor is attached to the feed table frame and supported along a length of the conveyor. A spacer is disposed between the conveyor and the feed table frame. The spacer supports the conveyor along substantially the entire length thereof. Alternatively, a plurality of spacers may be disposed between the conveyor and the feed table frame.

The shuttle vise comprises a first vertical column, a second vertical column, an upper guide rail interconnecting upper portions of the first and second vertical columns, a first jaw, and a second jaw. At least one of the first and second jaws is movably disposed on the upper guide bar. The first and second jaws are adapted for clamping engagement with the workpiece. The shuttle vise further comprises a clamping actuator for moving the one jaw into and out of clamping engagement with the workpiece and applying the clamping force thereto.

The clamping actuator may be attached to one of the vertical columns, and the reaction system may comprise a lever arm pivotally attached to the upper guide rail adjacent to the one vertical column, and a reaction actuator connected to the lever arm for applying the reaction force to the one vertical column. In a first embodiment, the reaction actuator is connected to an end of the lever arm such that the other end of the lever arm engages the one vertical column and thereby indirectly applies the reaction force thereto. In a second embodiment, the reaction actuator is attached to an end of the lever arm such that the reaction actuator engages the one vertical column and thereby directly applies the reaction force thereto.

In either of the first and second embodiments, the clamping actuator and the reaction actuator or actuators are hydraulic cylinders, and the clamping actuator and the reaction actuator are connected to a single pressure source. Regulators may be connected to the clamping actuator and the reaction actuator to maintain the pressures in the actuators such that the forces exerted thereby are substantially counterbalanced.

In a third embodiment, the reaction system comprises a clamping force bar disposed adjacent to the upper guide bar, wherein the clamping actuator is attached to the clamping force bar such that clamping forces are not transmitted to the vertical columns of the shuttle vise. A plurality of links are pivotally attached to the clamping force bar and to the upper guide bar. A reaction actuator may be included to engage one of the vertical columns.

In a fourth embodiment, the reaction system also comprises a clamping force bar disposed adjacent to the upper guide bar and further comprises a bushing mounted on the first vertical column. The clamping actuator is attached to the clamping force bar such that clamping forces are not transmitted to the vertical columns of the shuttle vise, and a rod portion of the clamping actuator extends through, and is supported by, the bushing.

In all of the embodiments, the conveyor has a guide rail extending from opposite sides thereof, and lower ends of the vertical columns in the shuttle vise are supported by the guide rails and movable therealong. A plurality of rollers are mounted on the lower ends of the vertical columns and engage the horizontal rails, thereby giving rolling support on the horizontal rails. The lower ends of the first and second vertical columns are not interconnected as is necessary in the prior art.

Numerous objects and advantages of the invention will become apparent as the following detailed description of the preferred embodiments is read in conjunction with the drawings illustrating such embodiments.

BRIEF DESCRIPTION OF THE DRAWINGS

FIG. 5 shows a front view of the prior art feed table of FIGS. 3 and 4 with an exaggerated illustration of the deflection of vertical columns of a shuttle vise if a lower cross beam is removed.

FIG. 6 is a perspective view of a first embodiment of the feed table with force reaction system of the present invention.

FIG. 12 illustrates an end view of a third embodiment of the present invention.

FIG. 13 shows a variation of the third embodiment.

FIG. 14 illustrates an end view of a fourth embodiment of the present invention.

FIG. 15 shows a variation of the fourth embodiment.

DETAILED DESCRIPTION OF THE PREFERRED EMBODIMENTS

Figure 1:
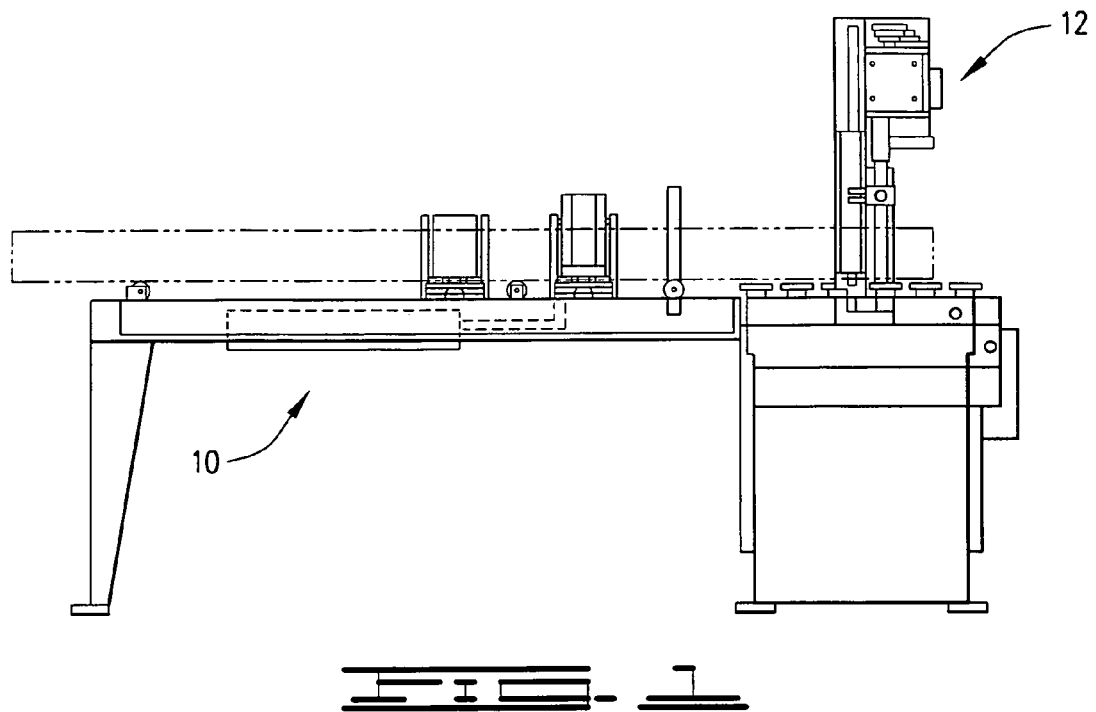
FIG. 1 is a side elevation view of the feed table with force reaction system of the present invention coupled to a machine tool such as a band saw.
Figure 2:
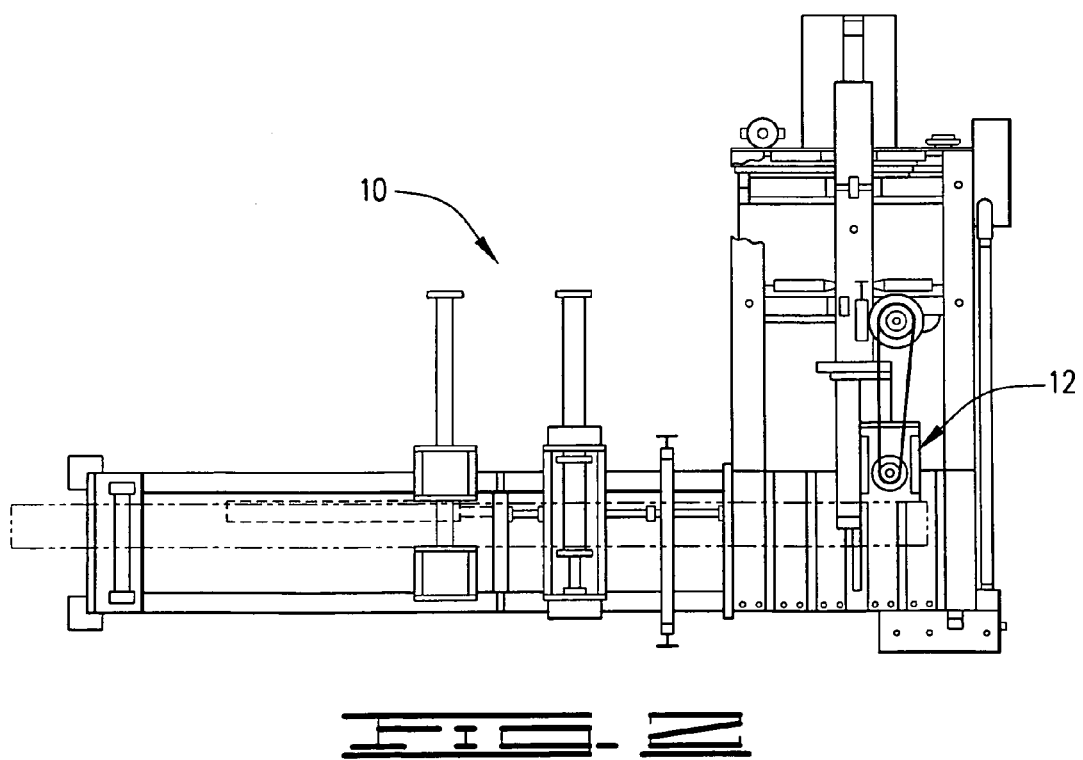
FIG. 2 is a plan view of the apparatus.

Referring now to FIGS. 1 and 2, the feed table with force reaction system of the present invention is shown and generally designated by the numeral 10. Feed table 10 is coupled to a machine tool 12 of a kind known in the art. Machine tool 12 is illustrated as a band saw, although other types of machine tools could be used such as a table saw, a drilling or milling machine, etc.

Prior Art Feed Table

Figure 3:
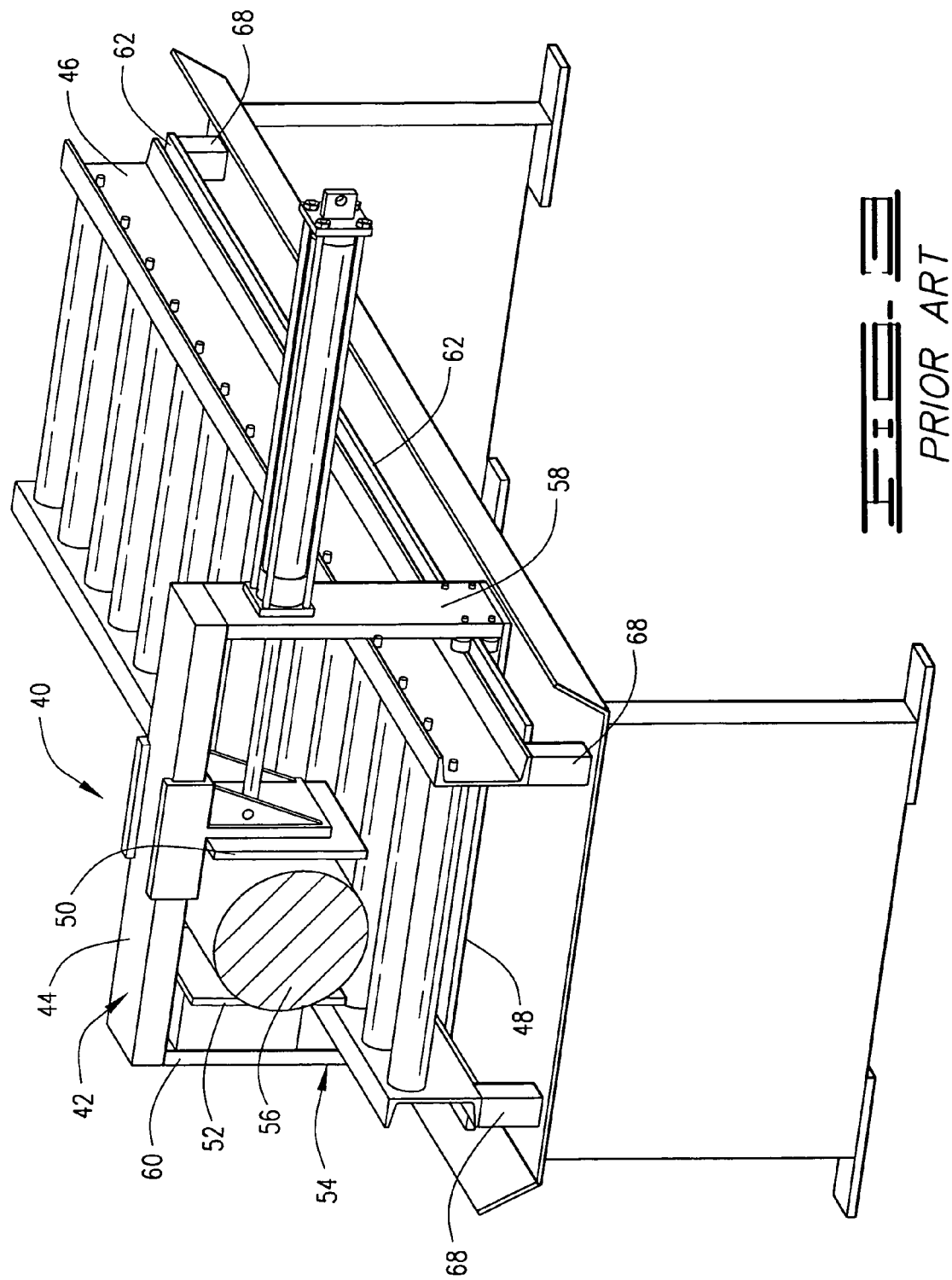
FIG. 3 is a perspective of a prior art feed table with a vise having a reaction frame.
Figure 4:
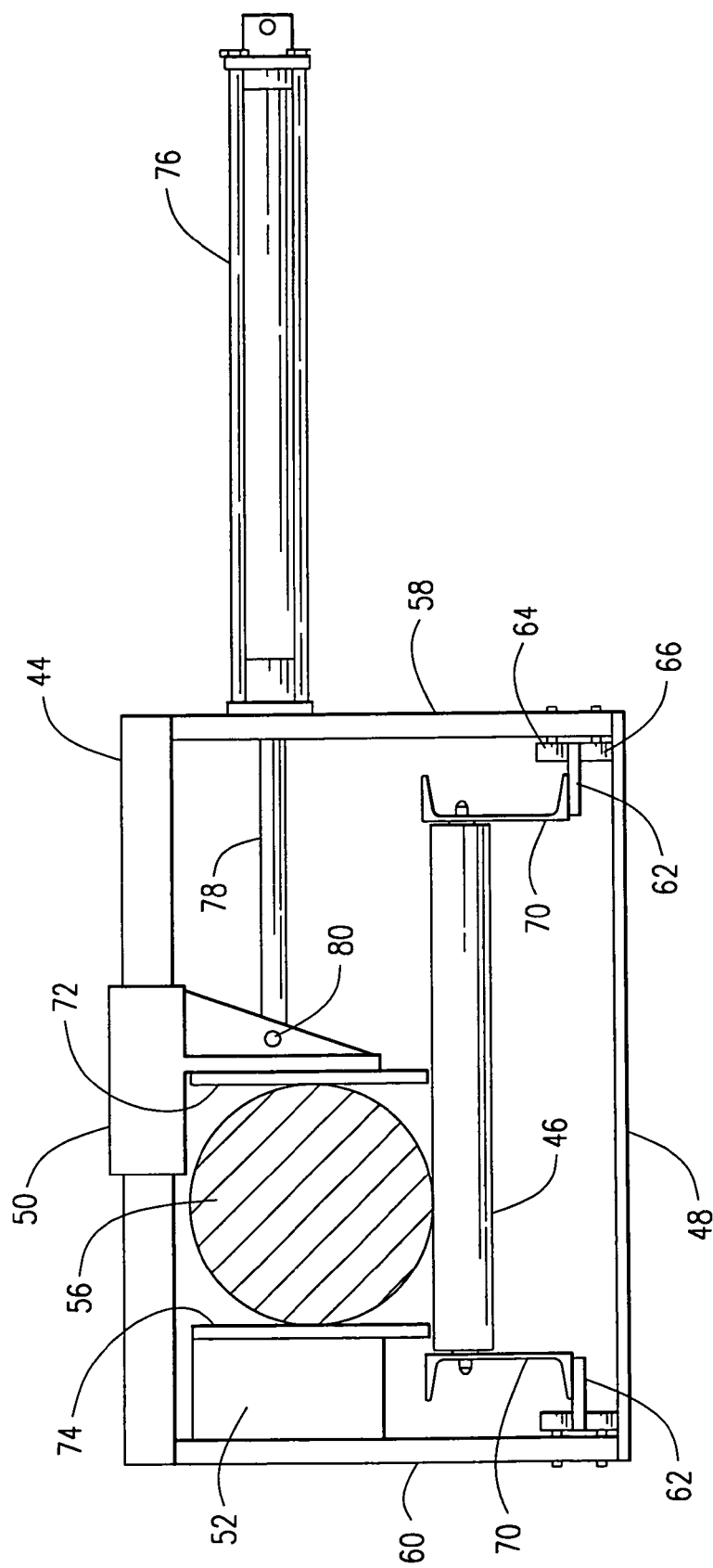
FIG. 4 presents an end view of the prior art system of FIG. 3.
Figure 3:
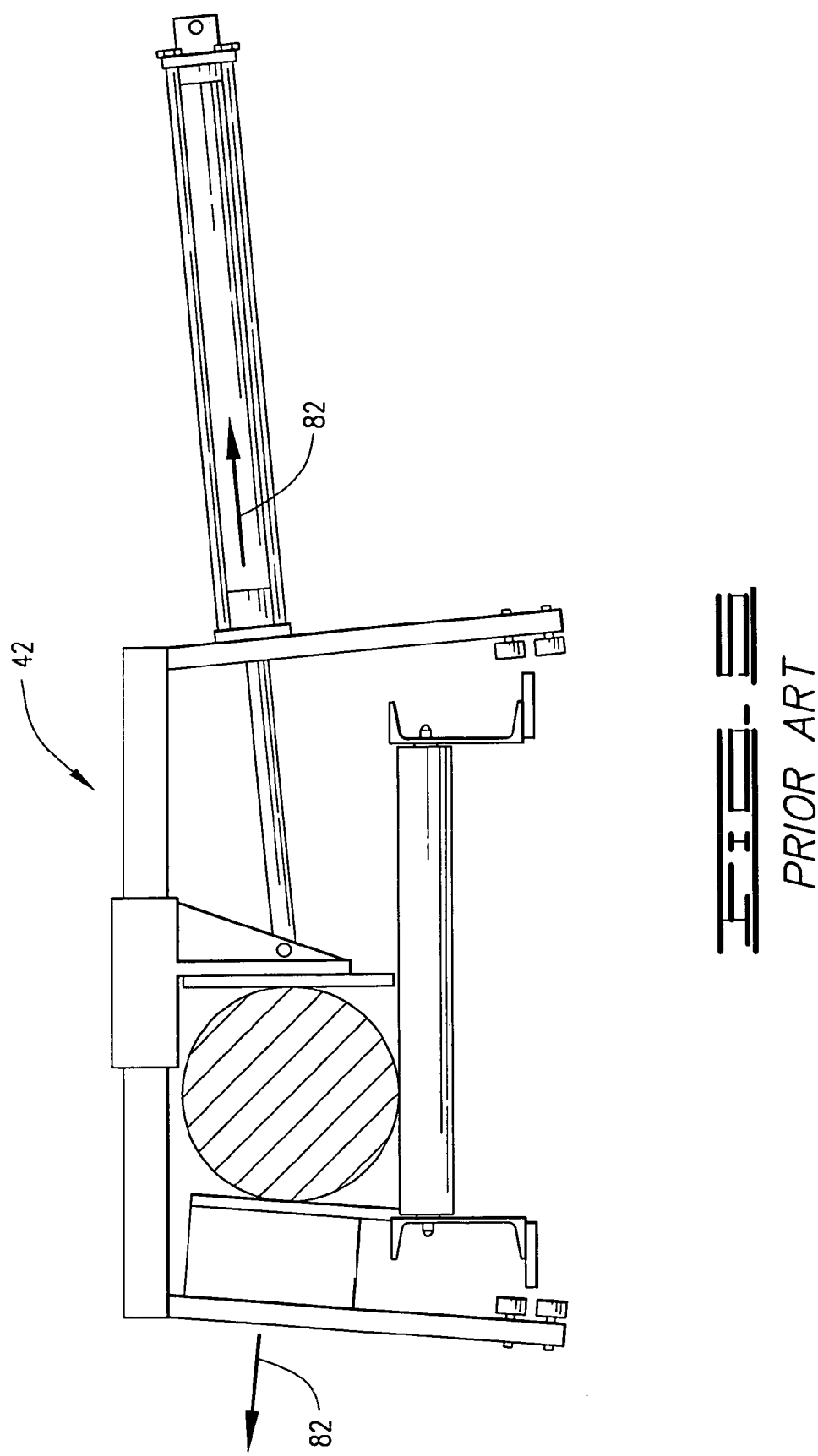

Referring now to FIG. 3, a prior art feed table 40 is shown. For simplicity, the known machine tool associated therewith is not illustrated.

Prior art feed table 40 includes a vise reaction frame assembly 42 having an upper cross beam or guide rail 44 above a guide roller assembly 46 and a lower cross beam or bar 48. Vise reaction frame assembly 42 is positioned to resist the tendency of opposing vise jaws 50 and 52 of a shuttle vise assembly 54 to open up in reaction to the clamping of workpiece 56. At least jaw 50 of shuttle vise assembly 54 is movable and mounted on a first upright post or vertical column 58. Opposite jaw 52 may be rigidly or movably fixed to a second upright post or vertical column 60.

In order to provide for movement of shuttle vise assembly 54, vise reaction frame assembly 42 must be capable of moving longitudinally along guide roller assembly 46. Thus, the lower portions of first and second vertical columns 58 and 60 are supported on horizontal rails 62 which extend along the sides of guide roller assembly 46 by a pair of upper rollers 64 and lower rollers 66. As best seen in FIG. 3, this construction requires that roller assembly 46 be raised and mounted on support legs 68 at the ends of roller frame members 70 so that lower bar 48 can pass below the roller frame members. The necessity of raising roller assembly 46 on legs 68 and the requirement for a lower bar 48 makes prior art feed table 40 relatively more complex, bulky and costly to construct as compared to feed table assembly 10 in FIGS. 1 and 2.

Movable vise jaw 50 is movably mounted on upper guide rail 44 and has a movable jaw wear plate 72 thereon adapted for engaging workpiece 56. Fixed jaw 52 is connected to second vertical column 60 and has a fixed jaw wear plate 74 thereon also adapted for engagement with workpiece 56. Movable jaw 50 is actuated by a clamping actuator known in the art such as a hydraulic clamp cylinder 76 with a clamp cylinder rod 78 extending therefrom. Clamp cylinder rod 78 is connected to movable jaw 50 by a rod pin 80.

Referring now to FIG. 5, prior art vise reaction frame assembly 42 is shown with lower bar 48 removed to illustrate the forces applied to first and second vertical columns 58 and 60 when clamp cylinder 76 is actuated to move movable jaw 50 into engagement with workpiece 56 so that the workpiece is clamped between the movable jaw and fixed jaw 52. If lower bar 48 is not present, the clamping forces would tend to spread the lower ends of first and second columns 58 and 60 apart as indicated by arrows 82 in FIG. 5. In prior art vise reaction frame assembly 42, these separation forces 82 are resisted by lower bar 48.

First Embodiment

Figure 8:
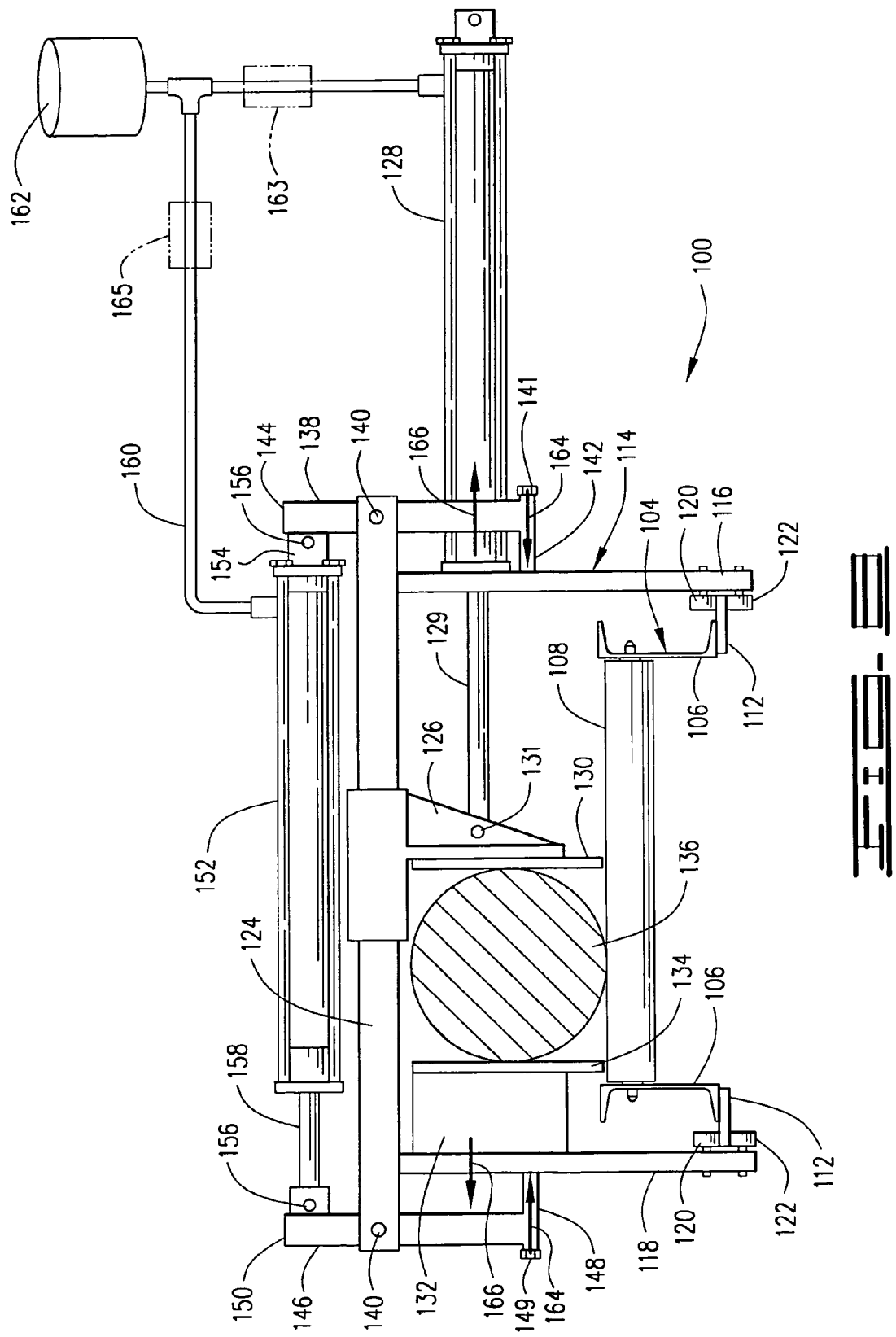
FIG. 8 shows an end view of the first embodiment.

Referring now to FIGS. 6 and 8, a first embodiment of the feed table with force reaction system of the present invention is shown and generally designated by the numeral 100. First embodiment 100 is adapted for use with a machine tool (not shown) in the same manner as the previously described prior art feed tables. First embodiment 100 includes a feed table frame 102.

Figure 7:
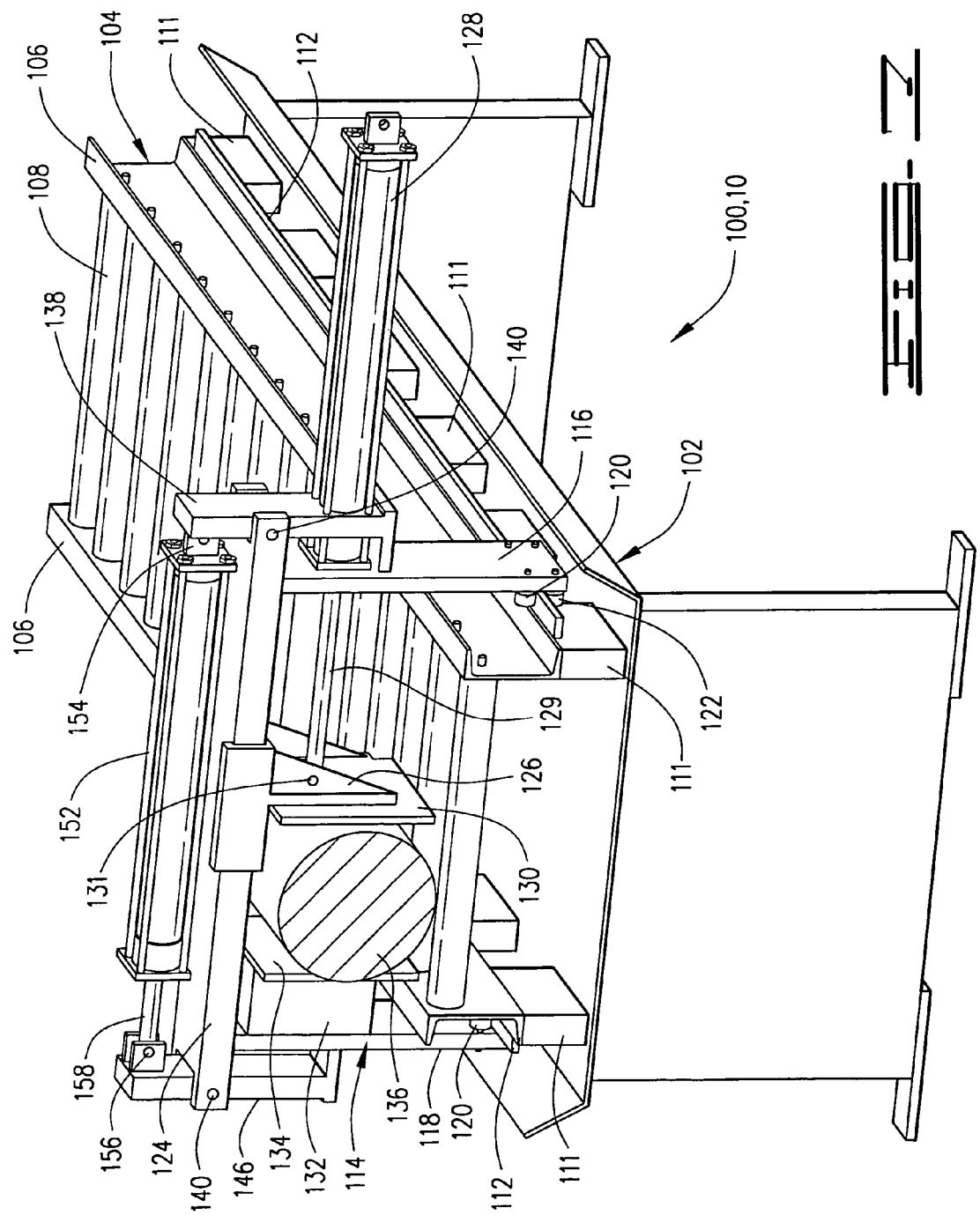
FIG. 7 shows an alternate construction of the first embodiment.

Feed table 100 has a guide roller assembly 104 having a pair of longitudinal frame members 106 with a plurality of rollers 108 extending therebetween. Frame members 106 are supported on feed table frame 102 by corresponding longitudinally extending spacers 110. Spacers 110 support frame members 106 along substantially the full length thereof. Alternately, a plurality of spaced supports 111 could be used as seen in FIG. 7.

As with prior art guide roller assembly 46, guide roller assembly 104 has horizontal rails 112 extending from the sides thereof adjacent to a lower portion of each frame member 106. A shuttle vise assembly 114 is movably supported on rails 112 in a manner similar to that of prior art shuttle vise assembly 54. That is, shuttle vise assembly 114 includes a first vertical column 116 on one side of guide roller assembly 104 and a second vertical column 118 on the other side of the guide roller assembly. Each of vertical columns 116 and 118 are supported on a corresponding rail 112 by a pair of upper rollers 120 and lower rollers 122. Unlike prior art feed table 40, in feed table 102 there is no lower bar or cross beam interconnecting the lower portions of first and second vertical columns 116 and 118.

An upper guide rail 124 interconnects the upper portions of first and second vertical columns 116 and 118 and extends outwardly therefrom. A movable jaw 126 is movably mounted on upper guide rail 124. A clamping actuator, such as a clamp cylinder 128, is mounted on first vertical column 116 and is adapted for actuating movable jaw 126. Thus, first vertical column 116 may be referred to as movable jaw vertical column 116. Clamp cylinder 128 has a clamp cylinder rod 129 connected to movable jaw 126 by a rod pin 131. A movable jaw wear plate 130 is attached to movable jaw 126.

A fixed jaw 132 is attached to second vertical column 118 which thus may be referred to as fixed jaw vertical column 118. A fixed jaw wear plate 134 is attached to fixed jaw 130. Movable jaw wear plate 130 and fixed jaw wear plate 134 are adapted for engaging a workpiece 136 when clamp cylinder 128 is actuated in a known manner.

A first lever arm 138 is pivotally attached to one end of upper guide rail 124 adjacent to first vertical column 116 by a lever pin 140. First lever arm 138 has a lower end 142 below lever pin 140 which engages first column 116 below clamp cylinder 128. An optional fastener 141 may be used if desired to attach lower end 140 to first vertical column 116. First lever arm 138 also has an upper end 144 above lever pin 140.

Similarly, a second lever arm 146 is pivotally attached to the other end of upper guide rail 124 adjacent to second vertical column 118 by another lever pin 140. Second lever arm 146 has a lower end 148 below lever pin 140 which engages second column 118. An optional fastener 149 may be used if desired to attach lower end 148 to second vertical column 118. Lower end 148 of second lever arm 146 is preferably aligned with lower end 142 of first lever arm 138. Second lever arm 146 also has an upper end 150 above lever pin 140. Upper end 150 of second lever arm 146 is preferably aligned with upper end 144 of first lever arm 138.

A reaction actuator, such as a reaction cylinder 152 is positioned above upper guide rail 124. An end 154 of reaction cylinder 152 is connected to upper end 144 of first lever arm 138 by a cylinder pin 156. Another end 158 of reaction cylinder 152 is pivotally connected to upper end 150 of second lever arm 146 by another cylinder pin 156. As shown in FIGS. 6-8, end 154 of reaction cylinder 152 is the housing end, and end 158 is the rod end. However, those skilled in the art will see that reaction cylinder 152 could be reversed. The invention is not intended to be limited to a particular orientation of reaction cylinder 152.

Reaction cylinder 152 is connected to clamp cylinder 128 by a hydraulic line 160. Line 160 is also in communication with a hydraulic pressure source 162 of a kind known in the art. As will be further discussed herein, first and second lever arms 138 and 146, reaction cylinder 152 and clamp cylinder 128 may be sized such that the reaction and clamp cylinders exert substantially the same force on first and second vertical columns 116 and 118 when pressure is applied thereto. Alternately, pressure regulators 163 and 165 of a kind known in the art may be used to maintain the necessary pressures in each of reaction cylinder 152 and clamp cylinder 128 to insure they counteract one another.

Figure 9:
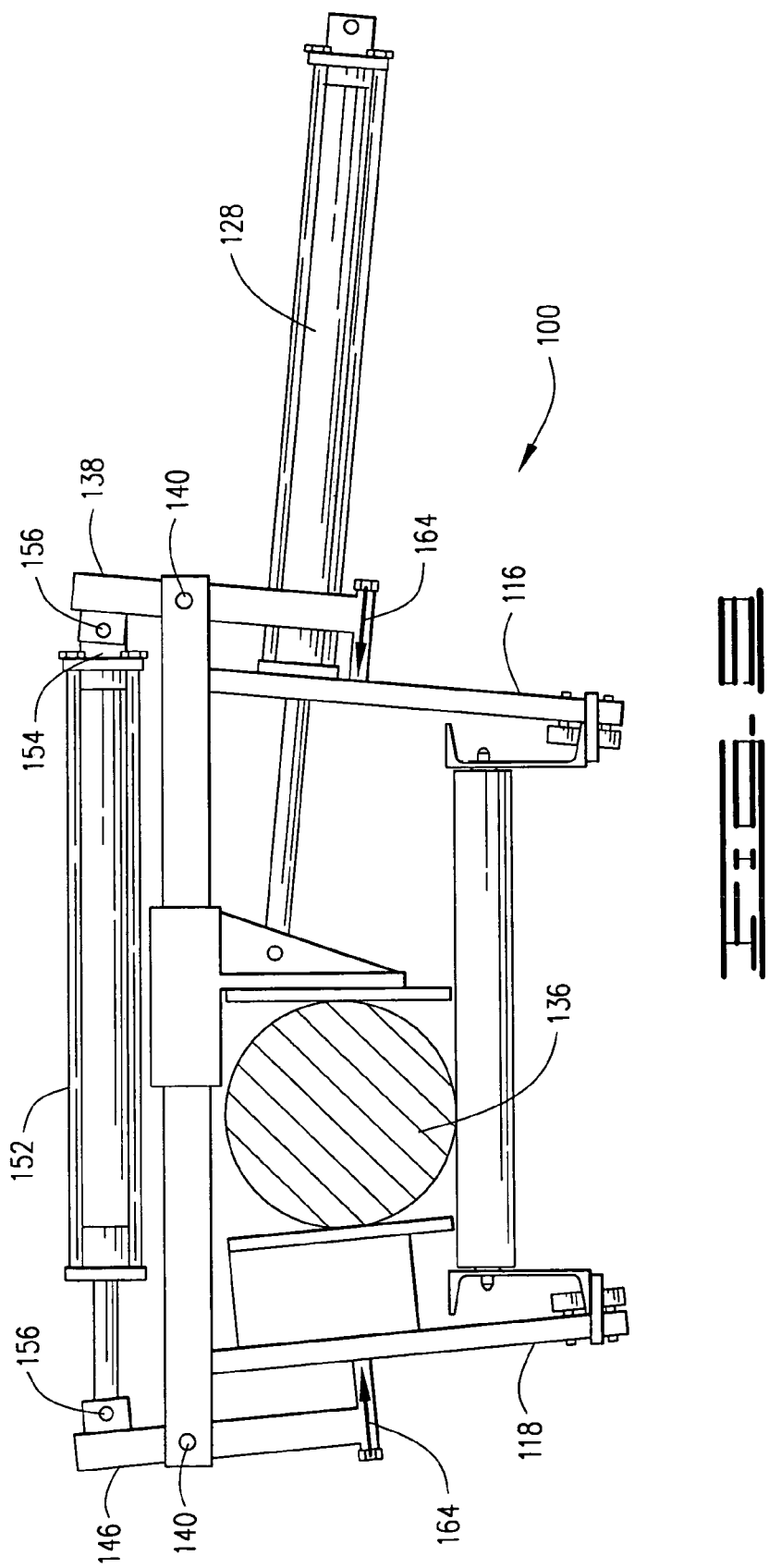
FIG. 9 is an exaggerated illustration of the results of forces from a compensating cylinder.

Referring now to FIG. 9, the forces resulting from reaction cylinder 152 are illustrated. When pressure is applied to reaction cylinder 152 extending the rod end thereof, upper ends 144 and 150 of first and second lever arms 138 and 146, respectively, are forced apart. Because of the pivotal mounting of first and second lever arms 138 and 146 on the ends of upper guide rail 124, lower ends 142 and 148 are forced toward one another which tends to move the lower portions of first and second vertical columns 116 and 118 together. The movement shown in FIG. 9 is exaggerated, but is illustrative. In other words, the actuation of reaction cylinder 152 applies forces to first and second vertical columns 116 and 118 as indicated by arrows 164. It will be seen by those skilled in the art that forces 164 are equal to the force applied by reaction cylinder 152 times the ratio of the length of the lower portions of the lever arms to the length of the upper portions of the lever arms.

As shown in FIG. 8, forces indicated by arrows 166 are applied by clamp cylinder 128 to first and second columns 116 and 118 tending to force them apart in a manner substantially identical to forces 82 on the prior art apparatus illustrated in FIG. 5. Because first and second lever arms 138 and 146, reaction cylinder 152 and clamp cylinder 128 are sized to balance forces 164 and 166, first and second vertical columns 116 and 118 remain substantially vertical and undeformed, as seen in FIG. 8, regardless of the clamping load on workpiece 136.

Second Embodiment

Figure 10:
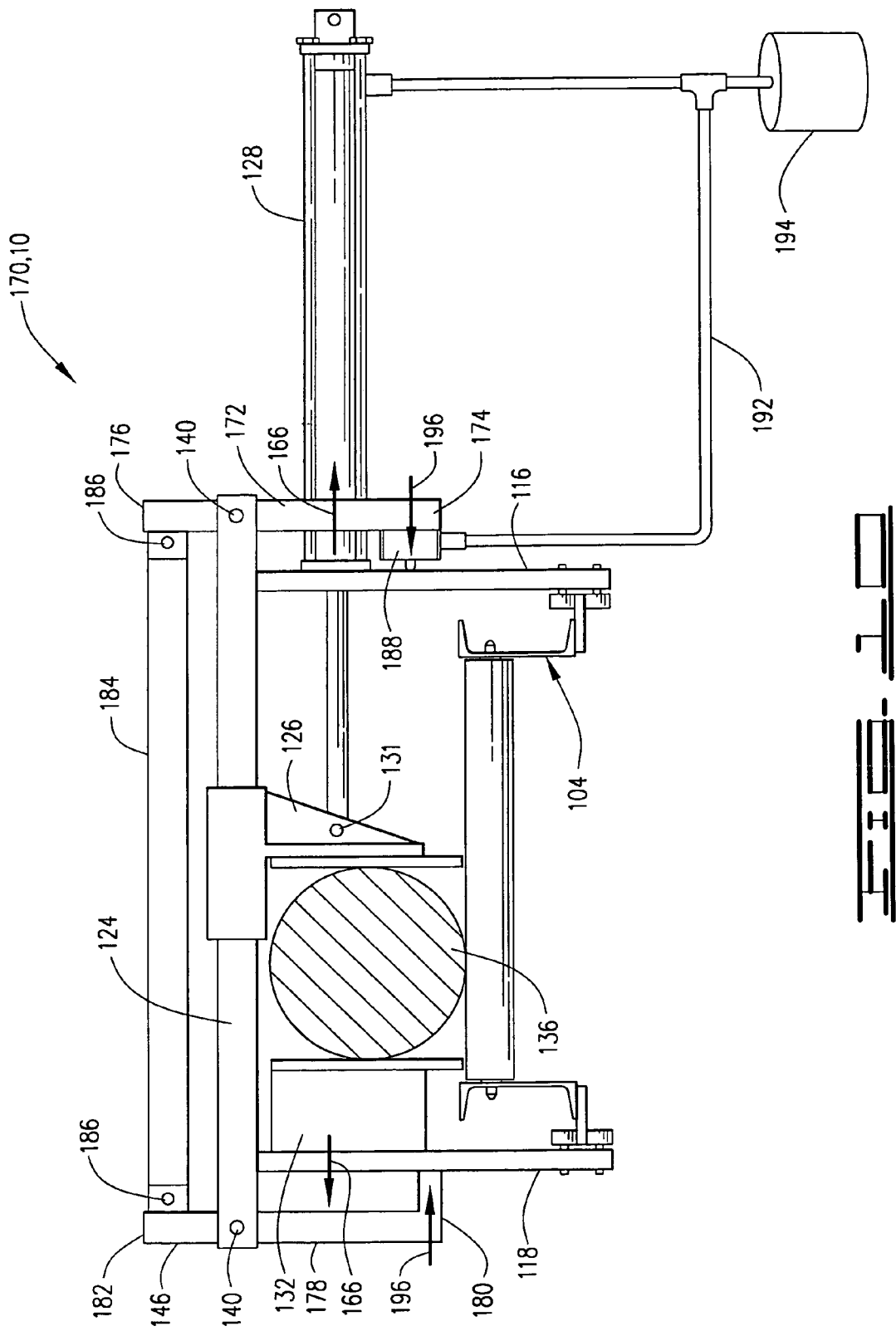
FIG. 10 shows an end view of a second embodiment of the apparatus of the present invention.

Referring now to FIG. 10, a second embodiment of the invention is shown and generally designated by the numeral 170. Reaction system 170 includes guide roller assembly 104, first and second vertical columns 116 and 118, movable jaw 126, fixed jaw 132, upper guide rail 124, lever pins 140 and clamp cylinder 128 which are substantially the same as in first embodiment 100 and thus are designated by the same reference numerals.

In second embodiment 170, a first lever arm 172 is pivotally attached to one end of upper guide rail 124 adjacent to first vertical column 116 by lever pin 140. First lever arm 172 has a lower end 174 below lever pin 140 and an upper end 176 above lever pin 140.

Similarly, a second lever arm 178 is pivotally attached to the other end of upper guide rail 124 adjacent to second vertical column 118 by another lever pin 140. Second lever arm 178 has a lower end 180 below lever pin 140. Lower end 180 of second lever arm 146 is preferably aligned with lower end 174 of first lever arm 172. Second lever arm 178 also has an upper end 182 above lever pin 140. Upper end 182 of second lever arm 178 is preferably aligned with upper end 176 of first lever arm 172.

Figure 11:
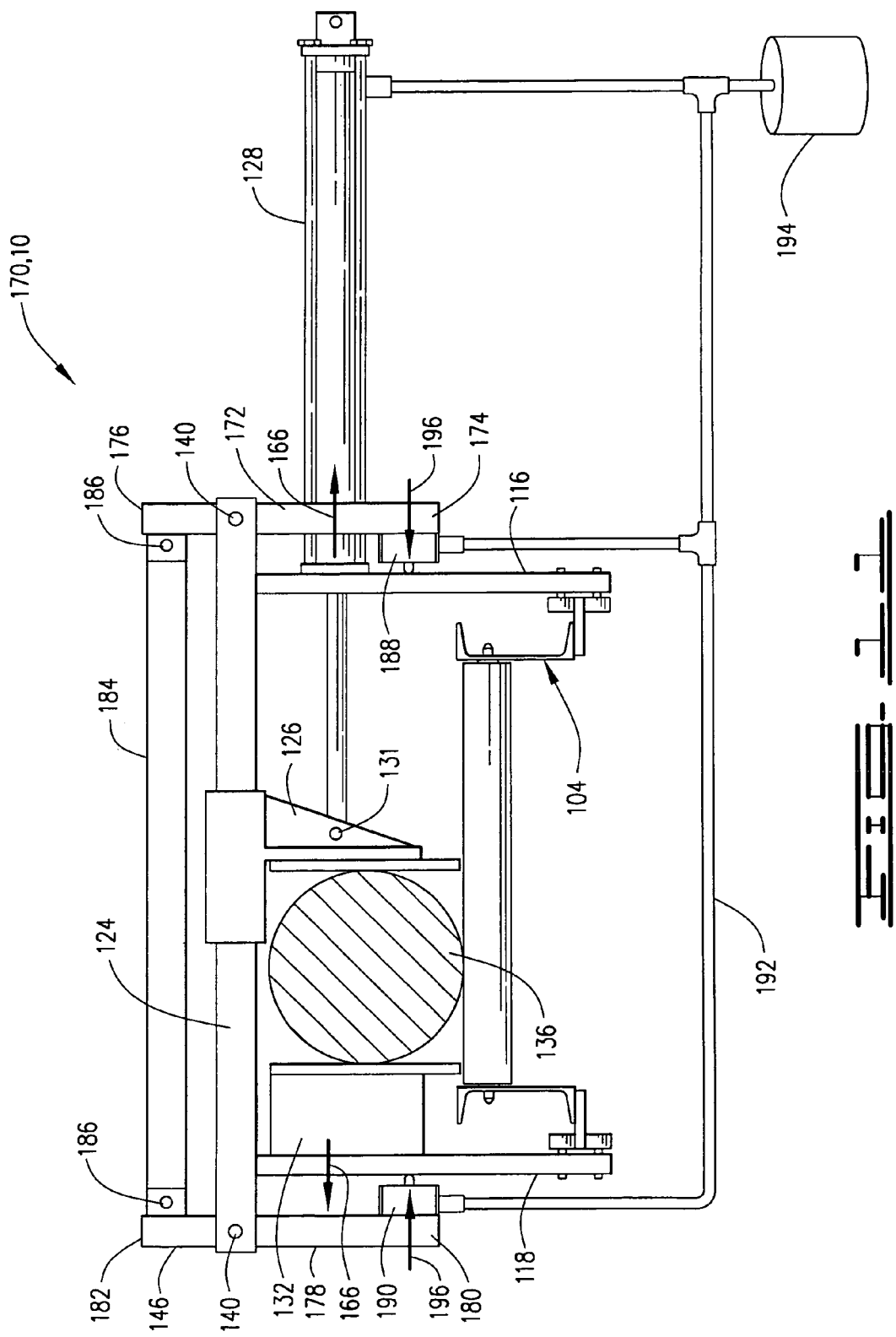
FIG. 11 is a view of a variation of the second embodiment.

Opposite ends of a reaction bar 184 are pivotally connected to upper end 176 of first lever arm 172 and upper end 182 of second lever arm 178 by bar pins 186. A reaction actuator, such as a first reaction cylinder 188, is mounted on lower end 174 of first lever arm 172. Optionally, as seen in FIG. 11, a second reaction cylinder 190 may be similarly mounted on lower end 180 of second lever arm 178. First reaction cylinder 188 and second reaction cylinder 190, if any, are thus adapted to apply forces tending to move first and second vertical columns 116 and 118 toward one another.

First reaction cylinder 188 is connected to clamp cylinder 128 by a hydraulic line 192, as seen in FIG. 10. Similarly, second reaction cylinder 190 may also be connected to hydraulic line 192. Hydraulic line 192 is also in communication with a hydraulic pressure source 194 of a kind known in the art. If both first and second reaction cylinders 188 and 190 are used, they are sized such that they exert substantially the same force on first and second vertical columns 116 and 118 as clamp cylinder 128 when pressure is applied thereto. Pressure regulators (not shown) could be used if necessary.

As shown in FIGS. 10 and 11, forces indicated by arrows 166 are applied by clamp cylinder 128 to first and second vertical columns 116 and 118 tending to force them apart as previously described. As seen in FIG. 10, first reaction cylinder 188 will apply forces 196 on first and second vertical columns 116 and 118 to counterbalance forces 166. As seen in FIG. 11, first and second reaction cylinders 188 and 190 are adapted to apply forces 196 on first and second vertical columns 116 and 118 to counterbalance forces 166. Either way, first and second vertical columns 116 and 118 remain substantially vertical and undeformed regardless of the clamping load on workpiece 136.

Third Embodiment

Referring now to FIG. 12, a third embodiment of the invention is shown and generally designated by the numeral 200. Reaction system 200 also includes guide roller assembly 104, first and second vertical columns 116 and 118, movable jaw 126 and fixed jaw 132 which are substantially the same as in first embodiment 100 and second embodiment 170 and thus are designated by the same reference numerals.

An upper guide rail 202 interconnects the upper portions of first and second vertical columns 116 and 118. Movable jaw 126 is movably mounted on upper guide rail 202.

A clamping force bar 204 is disposed above upper guide rail 202 and has a first leg 206 and a second leg 208 extending downwardly therefrom. A set of force bar links 210 are pivotally connected to clamping force bar 204 by corresponding force bar pins 212. Force bar links 210 are also pivotally connected to upper guide rail 202 by corresponding upper guide rail pins 214. In the preferred embodiment, there are a pair of force bar links 210 on both the front and back sides of clamping force bar 204 and upper guide rail 202 for a total of four. However, this can vary, and the invention is not intended to be limited to any particular number.

A clamp cylinder 216, used to actuate movable jaw 126, is mounted on first leg 206 of clamping force bar 204, and the rod portion 218 thereof passes through a hole 220 in first vertical column 116. Second leg 208 is attached to second vertical column 118 to support fixed jaw 132, as seen in FIG. 12. It will be seen by those skilled in the art that all of the clamping forces are absorbed by clamping force bar 204 so that none of the forces are applied to first and second vertical columns 116 and 118. Alternatively, as seen in FIG. 13, a fixed jaw clamp cylinder 222 may be positioned on the lower portion of second leg 208 to counteract the forces from clamping cylinder 216 and to prevent movement that would otherwise result from those forces.

Fourth Embodiment

Referring now to FIG. 14, a fourth embodiment of the present invention is shown and generally designated by the numeral 300. Fourth embodiment reaction system 300 is similar to third embodiment 200 except that there are no force bar links in the fourth embodiment.

An upper guide rail 302 interconnects the upper portions of first and second vertical columns 116 and 118. Movable jaw 126 is movably mounted on upper guide rail 302.

A clamping force bar 304 is disposed above upper guide rail 302 and has a first leg 306 and a second leg 308 extending downwardly therefrom.

A clamp cylinder 316, used to actuate movable jaw 126, is mounted on first leg 306 of clamping force bar 304, and the rod portion 318 thereof is supported in a bushing 320 disposed in a hole 322 in first vertical column 116. Second leg 308 is attached to second vertical column 118 to support fixed jaw 132, as seen in FIG. 14. Thus, clamping force bar 304 is supported on both ends. It will be seen by those skilled in the art that all of the clamping forces are absorbed by clamping force bar 304 so that none of the forces are applied to first and second vertical columns 116 and 118. Alternatively, as seen in FIG. 15, a fixed jaw clamp cylinder 324 may be positioned on the lower portion of second leg 308 to counteract the forces from clamping cylinder 316 and to prevent movement that would otherwise result from those forces.

Thus, in the present invention, the forces on first and second vertical columns 116 and 118 are balanced in first and second embodiments 100 and 170 and removed altogether in third and fourth embodiments 200 and 300. This is accomplished without the need of a lower bar or the resulting necessity of supporting a raised guide roller assembly on relatively weak legs.

It will be seen, therefore, that the feed table with force reaction system of the present invention is well adapted to carry out the ends and advantages mentioned as well as those inherent therein. While presently preferred embodiments have been described for the purposes of this disclosure, numerous changes in the arrangement and construction of the parts may be made by those skilled in the art. All such changes are encompassed within the scope and spirit of the appended claims.

The invention claimed is:

1. A feed table apparatus for use in moving a workpiece to a machine tool, the apparatus comprising:
a conveyor for supporting the workpiece, the conveyor having a guide rail extending from opposite sides thereof;
a shuttle vise movably disposed on the conveyor and having jaws thereon adapted for applying a clamping force to the workpiece while the workpiece is on the conveyor, the shuttle vise comprising:
a first vertical column;
a second vertical column;
an upper guide rail interconnecting upper portions of the first and second vertical columns, wherein at least one of the jaws is movably disposed on the upper guide rail; and
a clamping actuator for moving the at least one jaw into and out of clamping engagement with the workpiece and applying the clamping force thereto;
lower ends of the vertical columns in the shuttle vise being supported by the guide rails extending from the conveyor and moveable therealong;
a reaction system connected to the shuttle vise adapted for applying a reaction force in an opposite direction of the clamping force and thereby substantially counteracting the clamping force such that no reaction to the clamping force is applied to the conveyor; and
a plurality of rollers mounted on the lower ends of the vertical columns and engaging the guide rails extending from the conveyor and thereby giving rolling support thereon.

2. A feed table apparatus for use in moving a workpiece to a machine tool, the apparatus comprising:
a conveyor for supporting the workpiece;
a shuttle vise movably disposed on the conveyor, the shuttle vise comprising:
a first vertical column;
a second vertical column;
an upper guide rail interconnecting upper portions of the first and second vertical columns;
a first jaw movably disposed on the upper guide rail; and
a second jaw opposite the first jaw, at least one of the first and second jaws being movable; and
a clamping actuator attached to the first vertical column for moving the first jaw toward the second jaw and thereby providing clamping engagement of first and second jaws with the workpiece and applying a clamping force thereto; and
a reaction system connected to the shuttle vise adapted for applying a reaction force in an opposite direction of the clamping force and thereby substantially counteracting the clamping force.

3. The apparatus of claim 2 wherein:
the conveyor has a horizontal rail extending from opposite sides thereof; and
lower ends of the vertical columns in the shuttle vise are supported by the horizontal rails and moveable thereaolong; and
further comprising a plurality of rollers mounted on the lower ends of the vertical columns and engaging the horizontal rails and thereby giving rolling support on the horizontal rails.

4. The apparatus of claim 2 wherein lower ends of the first and second vertical columns are not connected.

5. A feed table apparatus for use in moving a workpiece to a machine tool, the apparatus comprising:
a conveyor for supporting the workpiece;
a shuttle vise moveably disposed on the conveyor, the shuttle vise comprising:
a first vertical column;
a second vertical column;
an upper guide rail interconnecting upper portions of the first and second vertical columns;
a first jaw moveably disposed on the upper guide bar; and
a second jaw opposite the first jaw; and
a reaction system connected to the shuttle vise and adapted for applying a reaction force in an opposite direction of the clamping force and thereby substantially counteracting the clamping force, the reaction system comprising a clamping force bar disposed adjacent to the upper guide bar; and
a clamping actuator for moving the first jaw toward the second jaw and thereby providing clamping engagement of the first and second jaws with the workpiece and applying a clamping force thereto, the clamping actuator being attached to the clamp force bar such that the clamping forces are not transmitted to the vertical columns of the shuttle vise.

6. The apparatus of claim 5 further comprising a bushing mounted on the first vertical column;
wherein, the clamping actuator has a rod portion extending through, and supported by, the bushing.

7. A feed table apparatus for use in moving a workpiece to a machine tool, the apparatus comprising:
a conveyor for supporting the workpiece, the conveyor having a guide rail extending from opposite sides thereof;
a shuttle vise movably disposed on the conveyor and having jaws thereon adapted for clamping the workpiece when a clamping force is applied thereto; the shuttle vise further comprising:
a first vertical column;
a second vertical column, lower ends of the vertical columns being supported by the guide rails extending from the conveyor and moveable therealong;

an upper guide rail interconnecting upper portions of the first and second vertical columns, wherein at least one of the jaws is movably disposed on the upper guide rail; and a clamping actuator attached to one of the vertical columns for moving the one jaw into and out of clamping engagement with the workpiece and applying the clamping force thereto; and a reaction system connected to the shuttle vise adapted for applying a reaction force in an opposite direction of the clamping force and thereby substantially counteracting the clamping force such that the clamping force is not applied to the conveyor; and a plurality of rollers mounted on the lower ends of the vertical columns and engaging the guide rails extending from the conveyor and thereby giving rolling support on the guide rails extending from the conveyor.

* * * * *